INVENTORS
JOSEPH F. BRYAN
MICHAEL A. MULSHINE JR.

BY Allen Ratner

Aug. 30, 1966   J. F. BRYAN ET AL   3,270,266
CONTROL SYSTEM
Filed April 17, 1964   3 Sheets-Sheet 2

INVENTORS
JOSEPH F. BRYAN
MICHAEL A. MULSHINE JR.

BY Allen Ratner

United States Patent Office 3,270,266
Patented August 30, 1966

1

3,270,266
CONTROL SYSTEM
Joseph F. Bryan, Oceanport, and Michael A. Mulshine, Jr., Oakhurst, N.J., assignors to Electronic Associates Inc., Long Branch, N.J., a corporation of New Jersey
Filed Apr. 17, 1964, Ser. No. 360,499
2 Claims. (Cl. 320—1)

This invention relates to high speed actuation means and has for an object the provision of a system which produces a high voltage pulse.

Systems are known for generating a high voltage short duration pulse for energizing an actuating device. Such systems have many uses, one of which is with symbol printing devices which print at a high rate of speed, as in the manner described in application, Serial No. 360,496 filed April 17, 1964, by Kenneth D. Peters, entitled, Symbol Printer, and assigned to the same assignee as the present invention. In such systems input data as well as data taken by brushes engaging a binary symbol wheel are applied to a coincidence detector. Upon coincidence of the input data and the brush data, a signal is applied to a generator to produce a high voltage pulse to energize a solenoid, for example, to stop a symbol wheel. Heretofore such systems have left much to be desired in speed and reliability of operation and in providing an energizing signal to the solenoid which would not have the effect of damaging it.

Accordingly, an object of the present invention is a control system which produces upon coincidence of the input signals a high voltage pulse maintained at a high voltage level for a short period of time.

Another object of the present invention is to maintain a predetermined D.C. voltage level after the termination of the high voltage pulse.

In accordance with the present invention there is provided a high voltage pulse generating system comprising first and second controlled semiconductor devices connected in a bistable circuit. In a normal or first state of the bistable circuit the first device is nonconductive while the second device is conductive to provide a circuit for charging a capacitor. When the bistable circuit is switched to a second state the first device is rendered conductive and provides a path for discharge of the capacitor to an output circuit for energizing an actuating device.

In a preferred form of the invention the second semiconductor device is connected between a source of supply and a capacitor for providing a charging circuit for the capacitor only when the second device is conductive, i.e. during the first state. In addition the first device is connected between the output circuit and the capacitor to provide a discharge circuit for the capacitor through the output circuit and the actuating device only when the first device is conductive, i.e. during the second state.

In one form of the invention there is provided a coincidence circuit which produces a signal to be applied to the pulse generator upon agreement of two sets of input data. That signal triggers a single shot circuit of the pulse generator which applies a first pulse to render the first device conductive thereby to provide for the discharge of the capacitor for energizing an actuating device. After the

2 time delay duration of the single shot a second pulse is produced which switches the second device from its nonconductive to its normal conductive state which is effective to return the first device to its normal nonconductive state. With the second device conductive there is provided a charging circuit for the capacitor through that device to a source of supply.

For further objects and advantages of the invention and for a description of its operation, reference is to be had to the following detailed description taken in conjunction with the accompanying drawings in which:

FIG. 1 schematically illustrates a system for energizing an actuating device upon coincidence of two sets of input signals;

Figure 1:
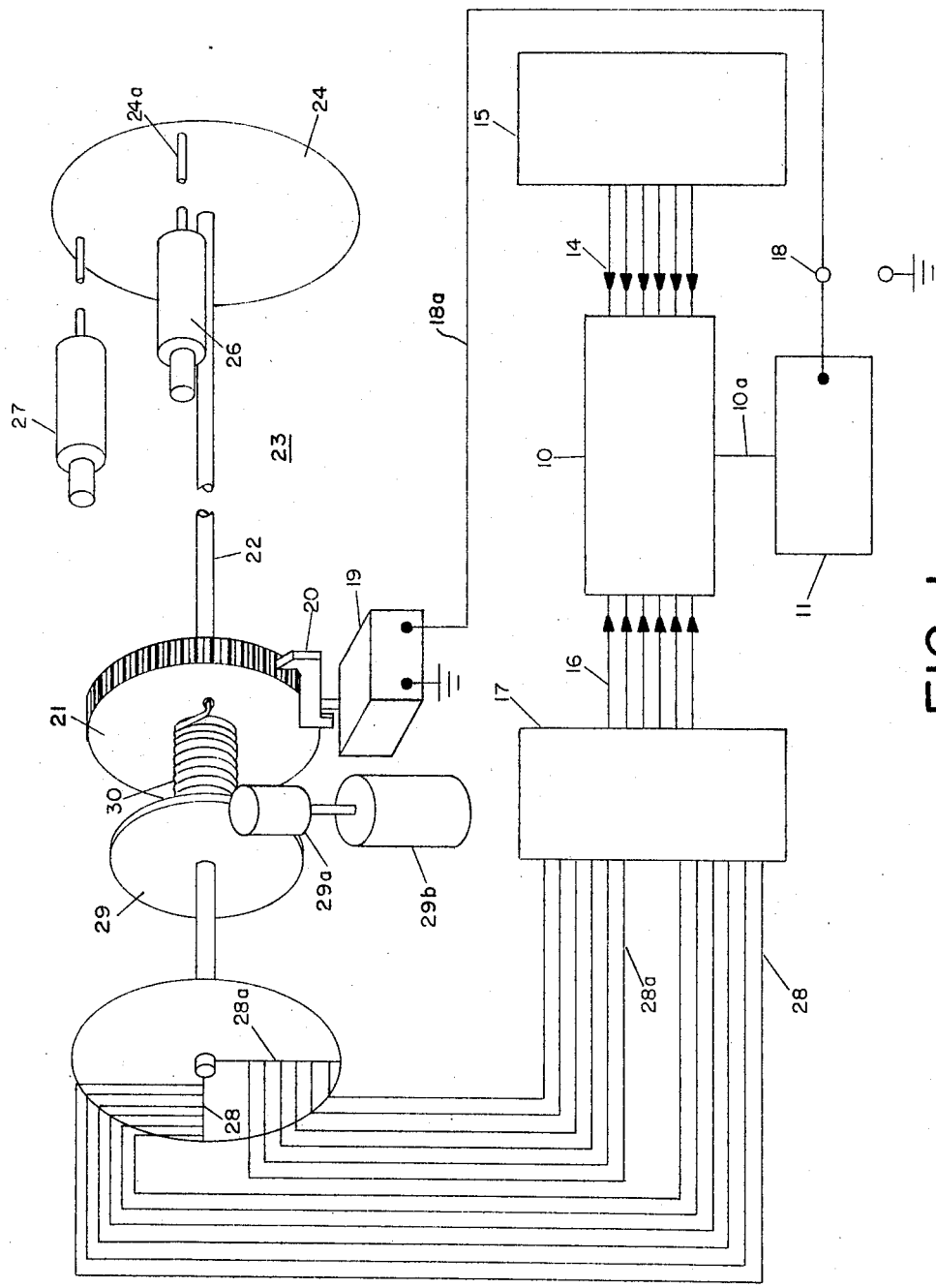

Referring now to FIG. 1 there is illustrated a coincidence detector 10 and a pulse generator 11 according to the invention. Coincidence detector 10 produces a positive going signal on output conductor 10a when coincidence is obtained between the applied input data on conductors 14 and the brush signal data on conductors 16. Upon application of that signal to pulse generator 11 there is produced a high voltage short duration pulse which is applied by way of output terminal 18 and conductor 18a to energize a detent solenoid 19.

With solenoid 19 energized a pawl 20 is moved into engagement with a tooth of a detent wheel 21 which is secured to a shaft 22 of printing apparatus 23. A rotatable symbol wheel 24 having a plurality of symbol slugs 24a (only two being shown) and a binary code wheel 25 are both secured to the shaft 22 so that when solenoid 19 is energized the detent wheel 21 as well as the symbol wheel and the binary code wheel are stopped. In this manner the symbol wheel 24 may be stopped according to the position of the code wheel 25 at a desired printing position and either the plot solenoid 26 or 27 may be energized for printing a desired symbol.

In order to position a desired symbol slug 24a under the armatures of solenoids 26 and 27, for example, the code wheel 25 operates in conjunction with brushes 28 and 28a. The brush 28 comprises six individual brushes which operate in conjunction with solenoid 26, while the brush 28a comprises another six individual brushes which operate in conjunction with solenoid 27. Both brushes 28 and 28a are connected to a gate or brush choice circuit 17 which may be operated so that the brush 28 data is transmitted through the gate and by way of the six conductors 16 to provide an input to the coincidence detector 10. Gate 17 may also be operated so that the brush 28a data is transmitted through the gate and by way of the six conductors 16 as an input to the coincidence detector 10. The remaining input to the detector 10 is from an input data source 15 which provides data in the form of six bit words with each bit of each word corresponding to a particular one of the six brush data bits. Each input data word corresponds to a particular code wheel position or symbol wheel position.

Code wheel systems have been used with brush choice circuits and detectors and such systems are well known in the art and are described, for example, in "Computer Handbook," edited by Huskey and Korn, McGraw-Hill, 1962, at pp. 18–46 et. seq.

As previously described when the brush data on conductors 16 corresponds to the input data on conductors 14 the solenoid 19 is energized and the shaft 22 is prevented from rotating. At that time a worm wheel 29 rotatably mounted on shaft 22 continues to be rotated by a worm 29a driven by an electric motor 29b. As the worm wheel 29 rotates it winds a torsion spring 30 and as that spring is wound it begins to store more and more potential energy and it becomes more difficult for the motor 29b to turn. As a result the motor gradually decreases in speed.

When a new input data word is produced by the source 15 coincidence will be lost by detector 10 and an output energizing signal will no longer be produced by generator 11 and thus solenoid 19 is deenergized. At that time the shaft 22 is free to rotate and the potential energy stored in the spring 30 is released which instantaneous release of energy is effective to cause immediate rotation of the shaft and the symbol wheel 24.

Figure 2A:
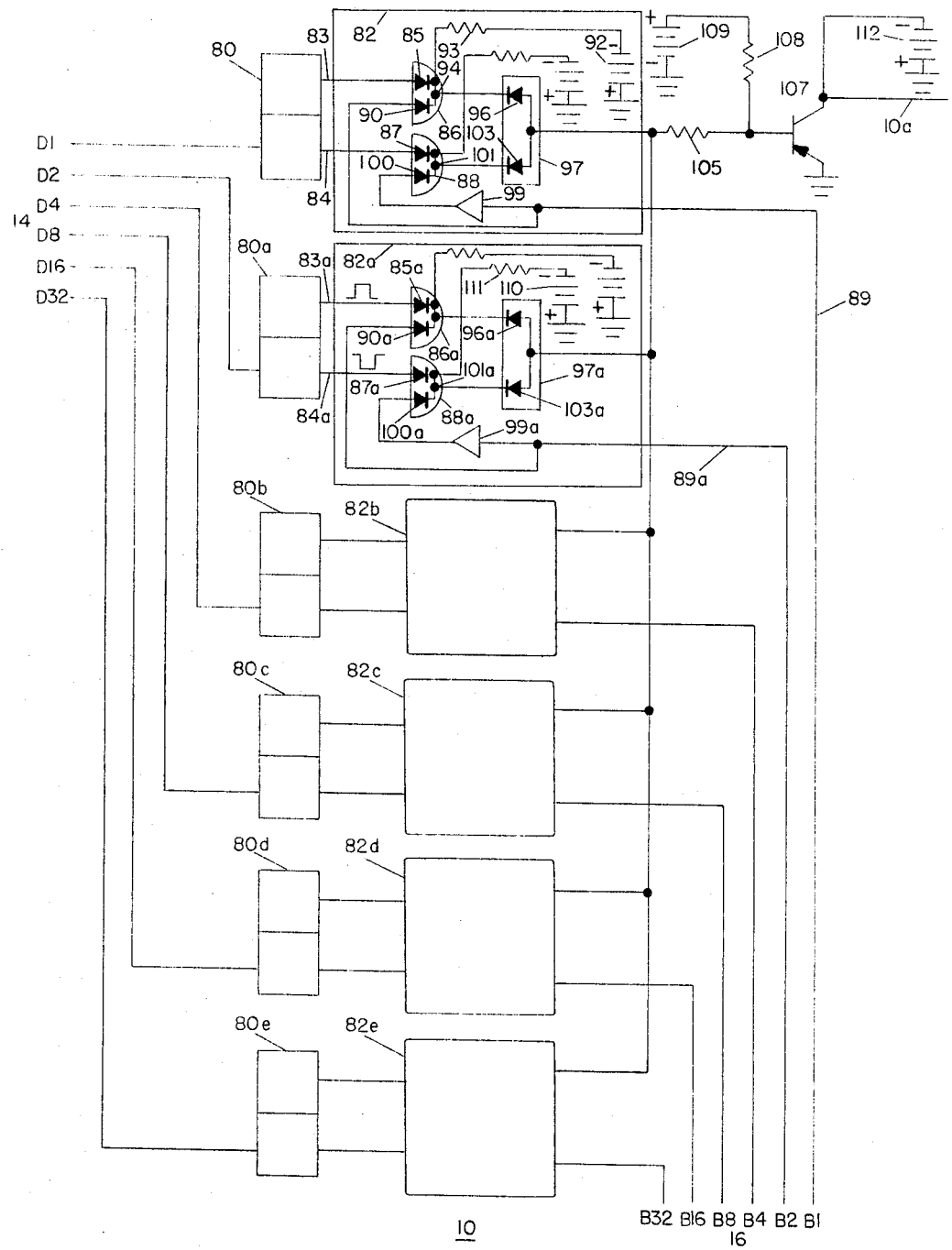
FIG. 2A illustrates the coincidence detector of FIG. 1.
Figure 2B:
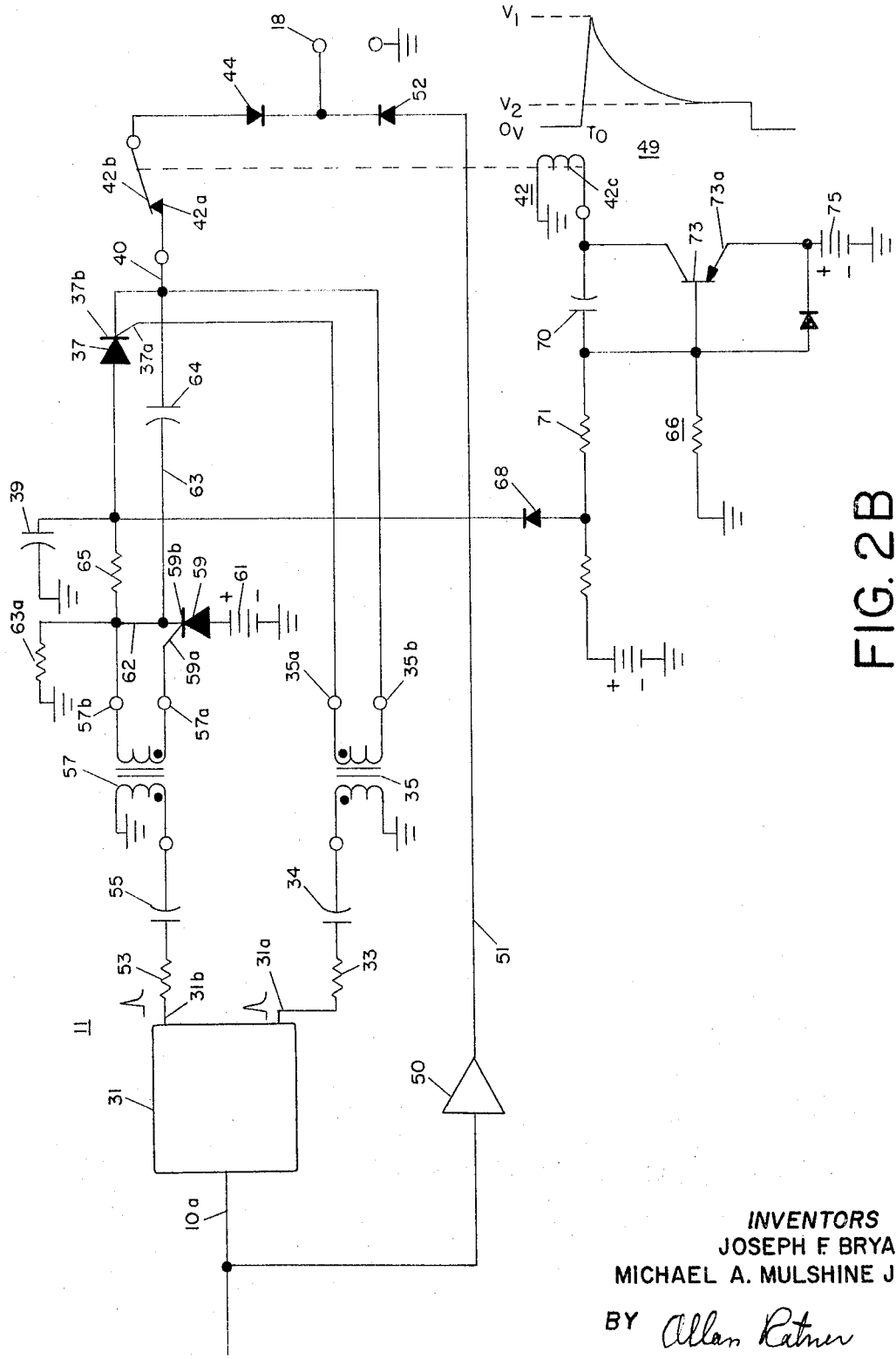
FIG. 2B illustrates the pulse generator of FIG. 1.

As above described it will be understood that with coincidence between a six-bit input data word and the six-brush code signal from the code wheel that the coincidence circuit 10 produces a positive going signal which is applied to the pulse generator 11 which is shown in more detail in FIG. 2B. The positive going signal from the coincidence detector is applied by way of conductor 10a to a trigger input of a single shot circuit 31. As well known in the art a single shot circuit upon being triggered may produce a positive going pulse at a first output terminal 31a and after a predetermined time duration may produce another positive going pulse at a second output terminal 31b. The first positive going pulse from output terminal 31a is applied by way of a resistor 33 and a capacitor 34 to an input of a pulse transformer 35.

Output terminals 35a and 35b of pulse transformer 35 are connected respectively to a gate electrode 37a and a cathode electrode 37b of a silicon controlled rectifier 37. Since a positive going potential is applied to the input of the pulse transformer 35, it will be understood that a positive going pulse is produced at terminal 35a which is effective to switch rectifier 37 from its normal nonconductive state to its conductive state.

As will later be described in detail, capacitor 39 has been charged so that its right-hand plate is positively charged with respect to its grounded left-hand plate. That right-hand plate is connected to the anode of rectifier 37 and with that rectifier conductive, capacitor 39 discharges through a circuit which may be traced by way of the rectifier, conductor 40, contact 42a, relay arm 42b of relay 42, diode 44, an output terminal 18 and then to solenoid 19 (FIG. 1) to ground. Thus, the capacitor 39 discharges through solenoid 19 thereby energizing that solenoid. Such energization takes place when a positive going pulse is applied to the pulse generator 11. As previously described, that pulse may be applied to the pulse generator when there is coincidence or agreement between the input data and the code brush data thereby to energize the solenoid 19 and to stop the symbol wheel at a desired position so that a symbol may be actuated for printing.

As previously described capacitor 39 discharges through rectifier 37 so that the potential at conductor 40 is at a high positive potential. That positive potential is applied by way of capacitor 64 and conductor 63 to the cathode 59b of rectifier 59 rendering that rectifier nonconductive from its previous normal conductive state.

It will be understood that with the use of a capacitor discharge circuit for energization of solenoid 19 there is produced an initial high voltage surge $V_1$ as shown in the waveform 49 to rapidly energize the solenoid. Thus, in accordance with the invention the solenoid is rapidly energized and there is avoided the application to the solenoid of a high voltage D.C. level which may damage the solenoid. As capacitor 39 discharges there is required an additional circuit to maintain solenoid 19 energized for the time a positive going signal is applied by way of conductor 10a from the coincidence circuit 10. For this purpose the output of that coincidence circuit is also applied to an input of an amplifier 50 which produces a positive output signal which is conducted by way of a line 51 and a diode 52 to the output terminal 18. That output of amplifier 50 is at a potential $V_2$ as shown in the waveform 49 and such potential is sufficient to maintain solenoid 19 energized.

At the termination of the time delay of the single shot 31 a positive going pulse is produced at its upper output terminal 31b and conducted by way of resistor 53, capacitor 55 to an input of a pulse transformer 57. Output terminal 57a of that pulse transformer is connected to a gate 59a of a silicon controlled rectifier 59 and the other output terminal 57b is connected to the cathode 59b of that rectifier. As a result of that positive going pulse applied to the input of transformer 57 a positive going pulse is produced at terminal 57a which is applied to gate 59a returning that rectifier 59 to its normal conductive state. With rectifier 59 conductive there is completed a circuit from the positive side of a battery 61, the anode and cathode of rectifier 59, conductor 62, resistor 63a to ground. In this manner a positive going pulse is produced at conductor 62 which is applied by way of conductor 63 and capacitor 64 to the cathode 37b of rectifier 37 returning that rectifier to its normal nonconductive state. With rectifier 59 conductive and rectifier 37 nonconductive it will be understood that the rectifiers are returned to their normal or first state and by this switching from one conductivity state to the other conductivity state these rectifiers effectively operate as a bistable circuit or a flip-flop. It is to be noted that in this bistable circuit the cathode 59b of rectifier 59 is connected by way of a capacitor 64 to a similar or corresponding electrode of a rectifier 37, viz. cathode 37b.

With the rectifiers 59 conductive capacitor 39 is charged since the right-hand plate thereof is connected by way of a resistor 65, conductor 62, conductive rectifier 59 to the positive side of battery 61, the negative side of which is connected to ground. Battery 61 has a potential equal to $V_1$ so that capacitor 39 charges up to that potential.

A circuit 66 is provided to protect rectifiers 37 and 59 and resistor 65. Such circuit is useful since if both rectifiers 37 and 59 are rendered conductive as a result of radio interference for example, then a large current will flow through both of these rectifiers and into solenoid 19 thereby damaging these circuits. Protection circuit 66 operates so that if capacitor 39 is not immediately positively charged as above described then diode 68 is rendered conductive and normally charged capacitor 70 begins to discharge by way of resistor 71. If capacitor 71 discharges the potential at its left-hand plate which is connected to the base of a transistor 73 drops below the potential applied to emitter 73a which is the positive potential of a battery 75, the negative side of which is connected to ground. At that time transistor 73 is rendered conductive so that a circuit may be traced by way of the positive side of battery 75, the emitter, base and collector of transistor 73 and through a relay coil 42c of relay 42 to ground.

In this way relay 42 is energized, shifting the arm 42b from contact 42a to open the circuit between conductor 40 and diode 44. As a result of this open circuit rectifier 37 no longer has a path to ground through the solenoid 19 and that rectifier is therefore rendered nonconductive. However, rectifier 59 remains conductive and is effective to recharge capacitor 39. As capacitor 39 charges the potential across capacitor 70 increases in a positive direction so that the potential at the base of transistor 73 is increased rendering that transistor nonconductive thereby energizing relay 42 and shifting arm 42b to close the circuit.

Coming now to FIG. 2A there is shown in more detail the coincidence circuit 10 of FIG. 1. The brush data from six brushes 28 or 28a is applied to the coincidence detector by way of six conductors 16 designated as B1, B2, B4, B8, B16 and B32. The six-bit input data is applied by way of the six conductors 14 and is designated D1, D2, D4, D8, D16 and D32. The input data bits D1–D32 are applied to lower input terminals of flip-flops 80–80e respectively. The outputs of the flip-flops 80–80e are respectively applied to detector circuits 82–82e with only circuits 82 and 82a being shown in detail since all of the detector circuits are of identical construction. In addition, the brush data bits B1–B32 are applied to circuits 82–82e respectively.

As previously described it is desired that a predetermined output be obtained when the input data bits 14 exactly agree or correspond to the brush data bits 16. It will be assumed that the input data is in the form of a word 011001 and the code wheel has turned to a position so that the brush data also provides the same signal 011001. In this example a bit in a "1" state is assumed to be a negative going signal, while a bit in a "0" state is assumed to be a positive going signal.

It will be understood that a bit in a "1" state is applied to flip-flop 80 to switch that flip-flop so that its upper output terminal 83 produces a negative going signal and its lower output terminal 84 produces a positive going signal. The negative going signal from output 83 is applied to a diode 85 of an AND gate 86 and is effective to render that diode nonconductive. The positive going signal from output 84 is applied to a diode 87 of an AND gate 88 to render that diode conductive.

It will be remembered that the B1 brush bit is in a "1" state which negative going signal is applied by way of a conductor 89 to a diode 90 of AND gate 86 to render that diode nonconductive. With diodes 85 and 90 nonconductive the negative potential from a battery 92 is applied by way of its negative side through resistor 93 to a junction 94 and then to a cathode of a diode 96 of an OR gate 97. In this manner diode 96 is rendered conductive when diodes 85 and 90 are rendered nonconductive.

The B1 brush bit in a "1" state is also applied by way of an inverter 99 to provide a positive going signal to a diode 100 of OR gate 88 to render that diode conductive. With diodes 87 and 100 conductive their common cathode junction is at approximately ground potential which is applied to the cathode of a diode 103 of OR gate 97 rendering that diode nonconductive. With diode 96 conductive a circuit may be traced by way of the negative side of battery 92, resistor 93, junction 94, conductive diode 96, resistor 105 to the base of transistor 107. In this way the negative side of a battery 92 is connected as an input of transistor 107.

In addition the base of transistor 107 is connected by way of a resistor 108 to the positive side of a battery 109 the negative side of which is connected to ground. Resistor 108 and battery 109 are selected so that the current flowing as a result of battery 92 is not sufficient alone to render transistor 107 conductive. In order to render transistor 107 conductive there is required to be connected thereto the negative side of a battery from each of the detectors 82–82e. Such application of a battery from each detector indicates coincidence between each input data bit and its corresponding brush signal bit.

It has been assumed that the D2 input data bit is in a "0" state so that there is produced from the lower output terminal 84a of flip-flop 80a a negative going signal and there is produced a positive going signal from the upper output terminal 83a. As a result diode 87a is rendered nonconductive while diode 85a is rendered conductive. In addition the B2 brush data bit is also in a "0" state which positive going signal is applied by way of conductor 89a to render conductive diode 90a. With diodes 85a and 90a rendered conductive, diode 96a is maintain nonconductive. However, the positive going signal on conductor 89a produces a negative going signal by way of inverter 99a which renders nonconductive diode 100a. With diodes 87a and 100a nonconductive, a circuit may be traced from the negative side of battery 110, resistor 111, junction 101a, conductive diode 103a, resistor 105 to the base of transistor 107.

It will now be understood that with coincidence between each input data bit and its respective brush code signal bit that all six detector circuits 82–82e produce a current flowing through resistor 105 to the base of transistor 107. Resistor 108 and battery 109 are selected so that all six currents from all six detector circuits 82–82e are required to provide a sufficient input current to the base of transistor 107 to render that transistor conductive.

With transistor 107 conductive its collector, which previously was at a negative potential determined by battery 112, changes in potential to ground potential. Such positive going signal is applied by way of conductor 10a to the pulse generator 11 as previously described in detail.

Now that the principles of the invention have been explained it will be understood that many modifications may be made. For example, the pulse generator 11 may be utilized in many other applications requiring a pulse output in the form of a discharge circuit for a capacitor.

What is claimed is:
1. A pulse generating system comprising
   first and second controlled semiconductor devices cross-connected with an electrode of said first device being connected to a similar electrode of said second device whereby in a first state said first device is nonconductive and said second device is conductive and in a second state said first device is conductive and said second device is nonconductive,
   electrical storage means comprising a capacitor,
   means including a source of supply connecting said second device to said capacitor for providing a charging circuit for said capacitor only when said second device is conductive,
   means for switching the state of said devices between said first and said second states,
   means connecting said first device between output means and said capacitor to provide a discharge circuit for said capacitor through said output means only when said first device is conductive,
   a coincidence circuit having applied thereto two sets of input data for producing a signal upon agreement of said two sets of data, and
   means for applying said signal to said switching means for changing the state of said devices from said first to said second state.

2. A system for generating a pulse for application to an actuating device for rapid energization of said actuating device comprising
   first and second controlled semiconductor devices cross-connected in a bistable circuit whereby in a first state said first device is nonconductive and said second device is conductive,
   a capacitor,
   means including a source of supply connected in circuit with said second device for providing a charging circuit for said capacitor when said second device is conductive,
   means for switching the state of said bistable circuit from said first to said second state whereby said second device is rendered nonconductive and said first device is rendered conductive for connecting said capacitor to said actuating device for discharge of a capacitor therethrough thereby to rapidly energize said actuating device for a substantially short discharge period of time, means for switching said bistable circuit from said second to said first state for recharging said capacitor,
a coincidence circuit having applied thereto two sets of input data for producing a signal upon agreement of said two sets of data, and
means for applying said signal to said switching means for changing the state of said devices from said first to said second state.

References Cited by the Examiner

UNITED STATES PATENTS

| | | | |
|---|---|---|---|
| 3,176,159 | 3/1965 | Laishley | 307—88.5 |
| 3,193,733 | 8/1965 | Orsino | 317—148.5 |

FOREIGN PATENTS 909,020  10/1962  Great Britain.

OTHER REFERENCES

Gutzwiller, F. W., et al.: Silicon Controlled Rectifier Manual 2d edition, General Electric Company, 1961 TK27984g (Section 4.14.2, pp. 51–52 relied upon).

IRVING SRAGOW, *Primary Examiner.*

J. F. BREIMAYER, *Assistant Examiner.*